(12) United States Patent
Truan et al.

(10) Patent No.: US 9,296,571 B2
(45) Date of Patent: Mar. 29, 2016

(54) CAB-FORWARD TRUCK BED MOUNTED MATERIAL SPREADER

(71) Applicants: Charles Truan, Bloomfield Hills, MI (US); Everett Hughes, Troy, MI (US); Greg Neilson, Troy, MI (US); Paul Yagiela, Rochester Hills, MI (US)

(72) Inventors: Charles Truan, Bloomfield Hills, MI (US); Everett Hughes, Troy, MI (US); Greg Neilson, Troy, MI (US); Paul Yagiela, Rochester Hills, MI (US)

( * ) Notice: Subject to any disclaimer, the term of this patent is extended or adjusted under 35 U.S.C. 154(b) by 60 days.

(21) Appl. No.: 14/182,681

(22) Filed: Feb. 18, 2014

(65) Prior Publication Data
US 2014/0231553 A1    Aug. 21, 2014

Related U.S. Application Data

(60) Provisional application No. 61/765,950, filed on Feb. 18, 2013.

(51) Int. Cl.
    *A01C 3/06*     (2006.01)
    *B65G 65/46*   (2006.01)
    *E01C 19/20*   (2006.01)

(52) U.S. Cl.
    CPC .............. *B65G 65/46* (2013.01); *E01C 19/203* (2013.01); *E01C 2019/208* (2013.01); *E01C 2019/2075* (2013.01)

(58) Field of Classification Search
    USPC ........................................................ 239/661
    See application file for complete search history.

(56) References Cited

U.S. PATENT DOCUMENTS

| | | | | |
|---|---|---|---|---|
| 3,687,376 | A | * | 8/1972 | Van Der Lely ............... 239/661 |
| 4,475,819 | A | * | 10/1984 | Balmer ......................... 366/107 |
| 5,028,009 | A | * | 7/1991 | Takata .......................... 239/655 |
| 5,931,393 | A | * | 8/1999 | Alsip et al. .................... 239/654 |
| 6,446,879 | B1 | * | 9/2002 | Kime .................................. 239/7 |
| 6,953,163 | B2 | | 10/2005 | Truan et al. |
| 7,370,818 | B2 | * | 5/2008 | Ward et al. .................... 239/662 |
| 7,540,436 | B2 | | 6/2009 | Truan et al. |
| 8,025,245 | B2 | | 9/2011 | Truan et al. |
| 2011/0220742 | A1 | * | 9/2011 | Sandler .......................... 239/661 |

FOREIGN PATENT DOCUMENTS

| | | |
|---|---|---|
| DE | 10331434 A1 | 2/2005 |
| EP | 0048465 A2 | 3/1982 |

* cited by examiner

*Primary Examiner* — Len Tran
*Assistant Examiner* — Adam J Rogers
(74) *Attorney, Agent, or Firm* — Dickinson Wright PLLC

(57) ABSTRACT

The subject invention provides an improved material spreader assembly for mounting in a truck bed of a vehicle. A hopper carrying a material to be dispersed is supported in the truck bed. An auger is disposed within the hopper to convey the material towards an outlet. A spinner assembly is longitudinally spaced from the outlet of the hopper. An extension assembly extends between the outlet of the hopper and the spinner assembly conveying the material therebetween. This allows for a cab-forward placement of the hopper and frame thereby moving the weight of the filled hopper and the frame forward towards the front of the vehicle resulting in improved weight distribution.

29 Claims, 8 Drawing Sheets

CAB-FORWARD TRUCK BED MOUNTED MATERIAL SPREADER

RELATED APPLICATIONS

This application claims the benefit of U.S. Provisional Application No. 61/765,950 filed on Feb. 18, 2013.

BACKGROUND OF THE INVENTION

1. Field of the Invention

This invention relates generally to material spreaders used for spreading a particulate, such as salt, sand, or salt and sand mixtures and, more particularly to a bed mounted spreader having an improved cab-forward design. It should be understood by those of ordinary skill in the art that the spreader of the present invention can be used to spread dry material as well as wet material.

2. Description of the Prior Art

Conventional truck bed mounted spreader assemblies typically have a large hopper that is placed in a truck bed of a vehicle. The hopper carries a material, such as bulk salt, to be distributed behind the vehicle. To maximize storage capacity, the hopper typically extends along the length of the truck bed between a front end and a rear end. The rear end of the hopper defines an outlet for discharging material from the hopper. An auger or similar device is disposed within the hopper to convey the material towards the outlet. A spinner assembly is typically mounted to the hopper adjacent the outlet for receiving the material as it exits the outlet and spreading it out on the roadway. To ensure that the material is evenly spread onto the roadway, the spinner is located just aft of the rear most portion of the truck bed such that the rear end of the hopper is substantially aligned with the rear most portion of the truck bed. One such related art spreader is shown in U.S. patent application Ser. No. 13/161,144 to Sandler et al., which shows a spreader assembly having a hopper having a rear end substantially aligned with the rear most portion of the truck bed and an auger running the length of the truck bed delivering material to a hopper mounted spinner assembly.

Conventional truck bed mounted spreaders are typically heavy, formed of thick sheet metals that are able to withstand corrosive environments that can be encountered when spreading certain materials, such as bulk salt. In addition to the weight of the spreader assembly, many hundreds of pounds of material is typically loaded into the hopper for spreading. Thus a problem arises in that conventional truck bed mounted spreaders place a substantial amount of weight on the rear most portion of the truck bed, thereby severely upsetting the weight distribution of the vehicle. This creates poor vehicle handling characteristics and places the vehicle chassis and suspension under considerable stress. What is needed is a truck bed mounted spreader assembly that distributes the weight of the assembly towards the center of the vehicle.

SUMMARY OF THE INVENTION

The subject invention provides an improved spreader assembly for mounting in a truck bed of a vehicle. In accordance with one aspect of the subject invention, the spinner assembly is longitudinally spaced from the outlet of the hopper. To maintain communication of the material between the hopper and the longitudinally spaced spinner assembly, the spreader assembly includes an extension assembly extending between the outlet of the hopper and the spinner assembly. The extension assembly projects substantially horizontally from the frame such that all components of the extension assembly are even with, or above, the frame and therefore the truck bed. This allows for a cab-forward placement of the hopper and frame wherein the front end of the hopper abuts the cab of the vehicle and the rear end of the hopper is positioned forward of the rear most portion of the truck bed. The extension assembly extends longitudinally from the outlet of the hopper to a position adjacent the rear most portion of the truck bed where it connects to the spinner assembly. In this manner, the extension assembly conveys or communicates the material exiting the outlet of the hopper to the spinner assembly. Accordingly, the cab-forward design of the spreader assembly, as provided by the extension assembly, moves the significant weight of the filled hopper forward towards the front of the vehicle. As a result, better front-to-rear weight distribution of the vehicle is achieved. The improvement in vehicle weight distribution over the prior art designs contributes to better vehicle handling characteristics and less stress on the vehicle chassis and suspension components.

Additionally, the extension assembly allows for a unique pre-wetting system to be used to pre-wet the material to be spread. The pre-wetting system includes a liquid injection nozzle that injects liquid onto the auger and the material being conveyed.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Referring to the Figures, wherein like numerals indicate like or corresponding parts throughout the several views, a spreader assembly 20 for spreading a material and for mounting to a truck bed of a vehicle is shown generally. The spreader assembly 20 is ideally suited for spreading materials such as sand, salt, seed, fertilizer, and the like. It is to be understood that the spreader assembly 20, being shown in FIG. 8 in the truck bed of a pick-up truck type vehicle, is adaptable for use with other vehicles, such as trailers, stake trucks, flat bed trucks, and the like. Where the vehicle is a pick-up truck or similar vehicle, the vehicle includes a cab positioned forward of the truck bed opposite a rear most portion of the truck bed.

Figure 1:
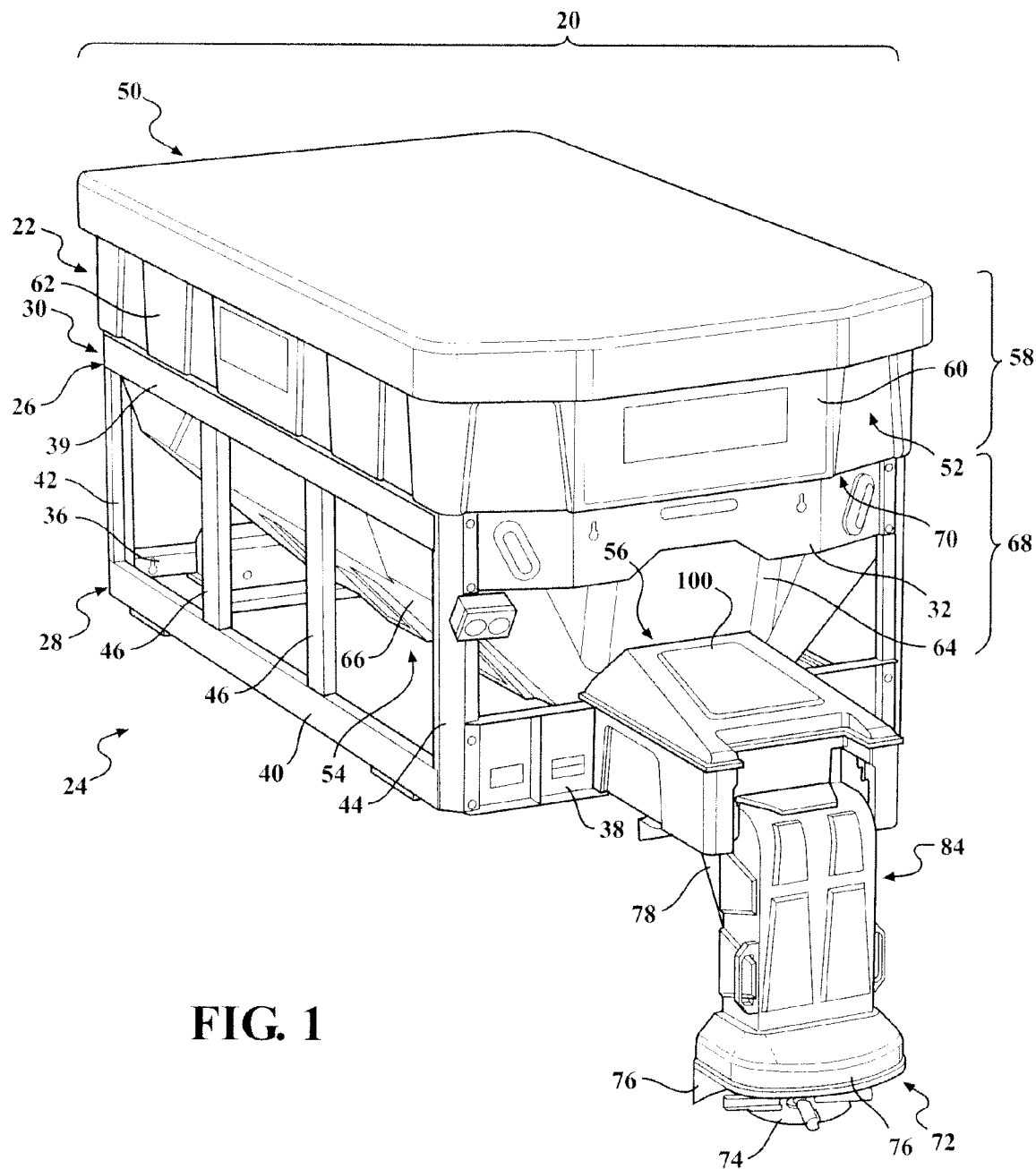
FIG. 1 is a perspective view of an exemplary truck bed mounted material spreader of the subject invention.
Figure 2:
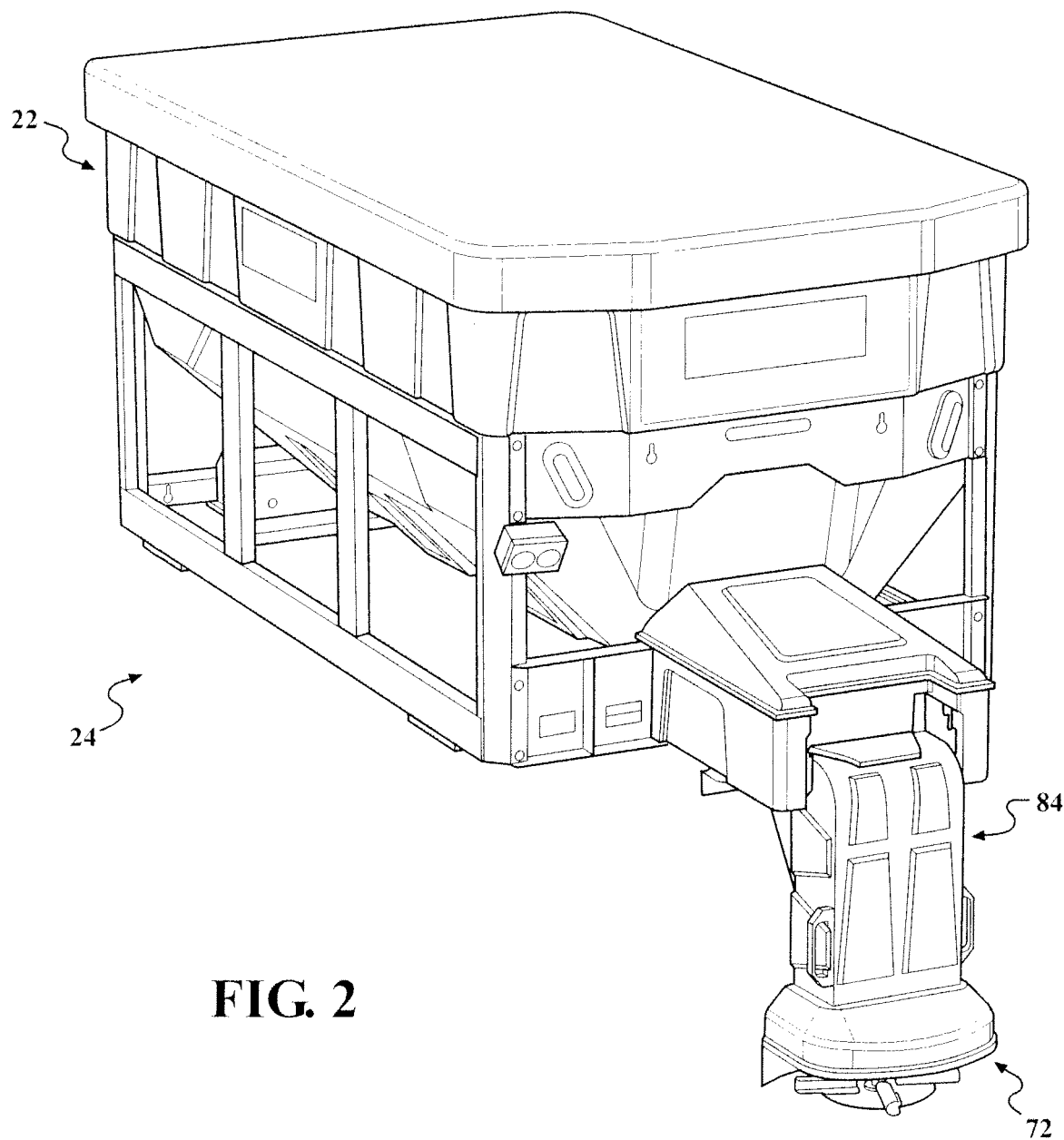
FIG. 2 is a perspective view of the exemplary truck bed mounted material spreader of the subject invention.

The spreader assembly 20 as illustrated includes a hopper 22 and a frame 24 as shown in FIGS. 1 and 2. The frame 24 has an upper rail 26 for supporting the hopper 22 in the truck bed and a lower rail 28 for engaging the truck bed. The upper rail 26 includes a front crossbeam 30 and a rear crossbeam 32, each extending transversely across the width of the truck bed. The upper rail 26 further includes a pair of upper longitudinal beams 34 extending longitudinally between the front and rear crossbeams 30, 32. The lower rail 28 includes a front base member 36 and a rear base member 38, each extending transversely across the width of the truck bed. The lower rail 28 further includes a pair of lower longitudinal beams 40 extending longitudinally between the front and rear base members 36, 38. The frame 24 also includes a pair of front posts 42 and a pair of rear posts 44 extending downwardly from the upper rail 26 to the lower rail 28. The front crossbeam 30 and the front base member 36 are positioned adjacent the cab of the vehicle when the spreader assembly 20 is mounted into the truck bed. The frame 24 may further include a plurality of vertical supports 46 extending downwardly from the upper longitudinal beams 34 to the lower longitudinal beams 40. The frame 24 distributes the weight of the spreader assembly 20 evenly across the truck bed and may be releasably mounted between the wheel wells of the truck bed. It should be appreciated that the frame 24, or any combination of its components, could be formed of a continuous piece or individual pieces. In one embodiment, the frame 24 may be a single integral piece. Alternately, each component of the frame 24 may be an individual piece fastened together to form the frame 24 and may be fastened by any methods, such as welding, bolting, and the like. Additionally, the frame 24, or any combination of its components, may be constructed of any material, such as plastic or metal, so long as the material is strong enough to support the weight of the spreader assembly 20 when it is fully loaded with a material to be dispersed on the ground beneath the vehicle, such as a roadway. For example, the material to be dispersed may be salt, sand, salt and sand mixtures, or any other particulate material.

Still further, the hopper 22 can have an integrally formed frame 24 or merely have an integrally formed support, such as legs or feet to support the hopper 22. In the disclosed embodiment, the hopper 22 is generally loosely connected to the frame 24 to allow the hopper 22 to vibrate as the vehicle travels along the roadway. This also allows for quick removal of the hopper 22 when empty. Such a loose connection can be accomplished by securing the hopper 22 to the frame 24 using bolts or straps for example. The hopper 22 is a large capacity hopper 22 capable of containing a large quantity of material to be spread, which results in fewer stops to refill the hopper 22 with material. For example, the hopper 22 may allow for a ¼ of a cubic yard or more of material to be carried by the vehicle. Preferably, the hopper 22 is made of a thermoplastic material, but other materials, such as metal, may be utilized. The thermoplastic material is advantageous because it does not rust, the material does not stick to the sides, and it requires no painting. Also, thermoplastic material is very durable and can be easily removed without damage. The thermoplastic material is also very light such that the frame 24 and hopper 22 may weigh 500 lbs. less than other commercial systems. Preferably, the hopper 22 and frame 24 weigh less than 400 lbs., but this is not intended to limit the subject invention. The hopper 22 is preferably formed by rotational molding, or roto-molding. Roto-molding is known to those skilled in the art of molding parts.

The hopper 22 has a front end 50, a rear end 52, and a bottom 54. Accordingly, when the spreader assembly 20 is mounted in the truck bed, the front end 50 of the hopper 22 faces the cab of the vehicle. The rear end 52 of the hopper 22 defines an outlet 56 for discharging the material contained within the hopper 22. The bottom 54 of the hopper 22 may be horizontal wherein the bottom 54 of the hopper 22 is parallel with the truck bed. Alternatively, the bottom 54 of the hopper 22 may be downwardly sloping toward the rear end 52 of the hopper 22 to facilitate the flow of material towards the outlet 56. The hopper 22 may include an upper portion 58 having four upper walls 60, 62 and a lower portion 68 including the bottom 54 and four lower walls 64, 66. The four upper walls 60, 62 may include a pair of upper end walls 60 and a pair of upper side walls 62. The four lower walls 64, 66 may include a pair of lower end walls 64 and a pair of lower side walls 66. Accordingly, the lower end walls 64 and the upper end walls 60 may combine to form the front and rear ends 50, 52 of the hopper 22. In the disclosed embodiment, at least the lower side walls 66 are slanted such that the width of the hopper 22 tappers inwardly towards the bottom 54 to promote the release of the material in a continual and even flow and to prevent clogging. The intersection of the upper portion 58 and the lower portion 68 may define a flange 70. The flange 70 engages the upper rail 26 when the hopper 22 is inserted into the frame 24. Each of the upper walls 60, 62, the bottom 54, and the lower walls 64, 66 may have reinforced portions 58, 68 for strengthening the respective wall. The upper walls 60, 62 may define an open top through which material may be loaded into the hopper 22. A cover may be supported by the upper walls 60, 62 to cover the top and prevent the elements from entering the hopper 22. The cover may be a vinyl tarp or a metal or plastic cover.

Figure 3:
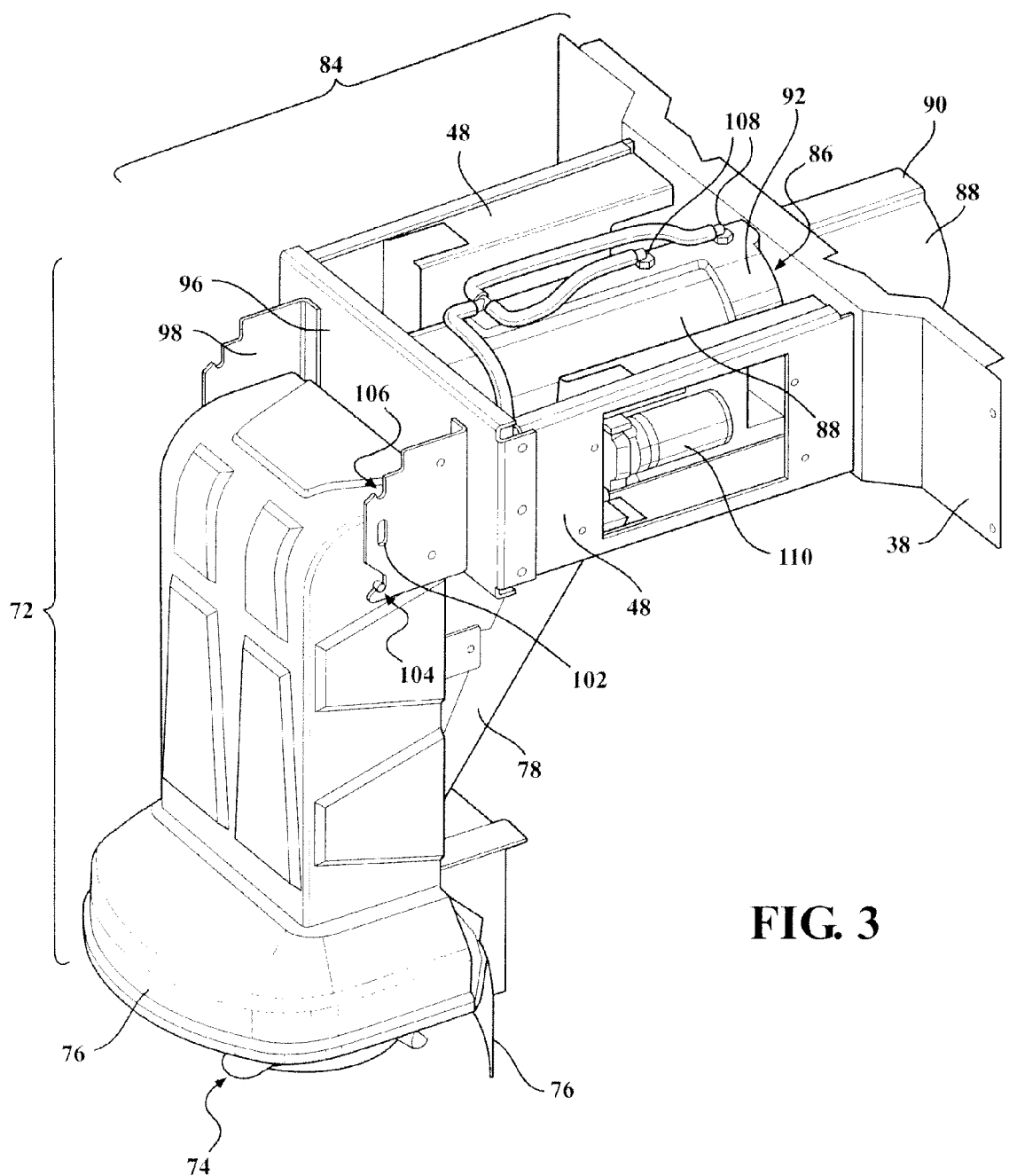
FIG. 3 is a perspective view of an exemplary extension assembly and spinner assembly of the subject invention.
Figure 4:
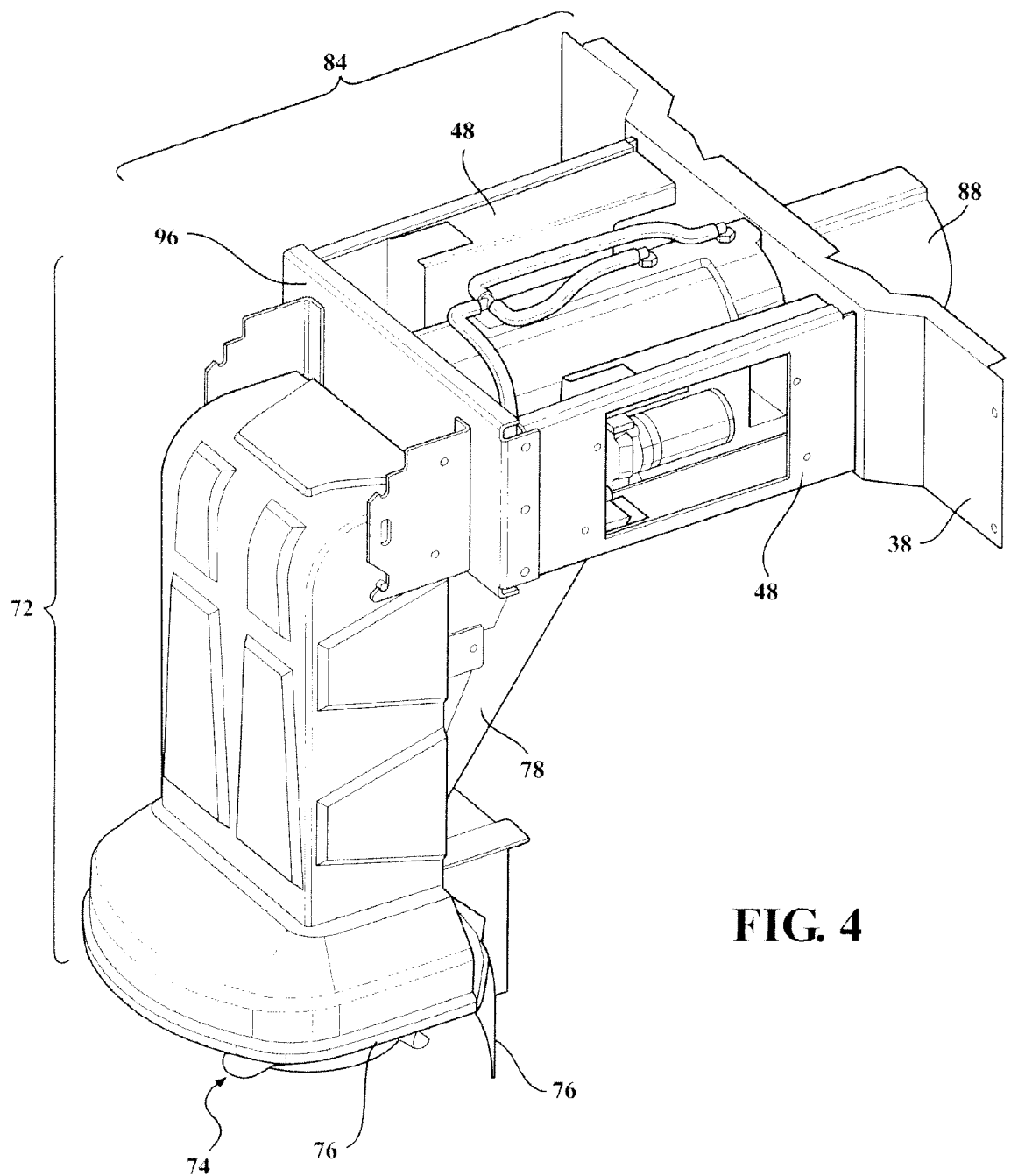
FIG. 4 is a perspective view of the exemplary extension assembly and spinner assembly of the subject invention.

As shown in FIGS. 3 and 4, a spinner assembly 72 is connected in communication with the outlet 56 of the hopper 22 wherein the material discharged from the outlet 56 of the hopper 22 is communicated to the spinner assembly 72. The spinner assembly 72 includes a drive shaft (not shown) connected to a disc 74 for receiving material communicated to the spinner assembly 72 from the outlet 56 of the hopper 22. The drive shaft is driven and rotates the disc 74. As the material impacts the disc 74, the material is thrown or spread over a large distribution area, such as the roadway, as is known in the art of material spreaders. A material deflector 76 may also be attached to the spinner assembly 72 to assist in directing the material away from the vehicle and towards the distribution area. The spinner assembly 72 may include a feed chute 78 extending downwardly for directing the material through the spinner assembly 72 and to the disc 74. In the preferred embodiment, the drive shaft is positioned vertically and is driven by a motor and transmission assembly (not shown), which are mounted outside the hopper 22. A cover is used to protect the motor and transmission from the elements. The motor, transmission, and cover may be mounted to the frame 24, preferably by bolts for easy removal and maintenance. As is known in the art, the motor and transmission assembly may take many forms. For example, the motor and transmission assembly may include an electric motor or a hydraulic motor. Alternatively, the motor and transmission assembly may incorporate an engine and output shaft of the vehicle. Where the motor is an electric motor, the motor includes a power cord to connect to the vehicle power supply, which is not shown. A support frame 24 of the spinner assembly 72 supports 46, 48 the feed chute 78, material deflector 76, drive shaft, and disc 74. A housing may attach to the support frame 24 to cover these parts.

Figure 5:
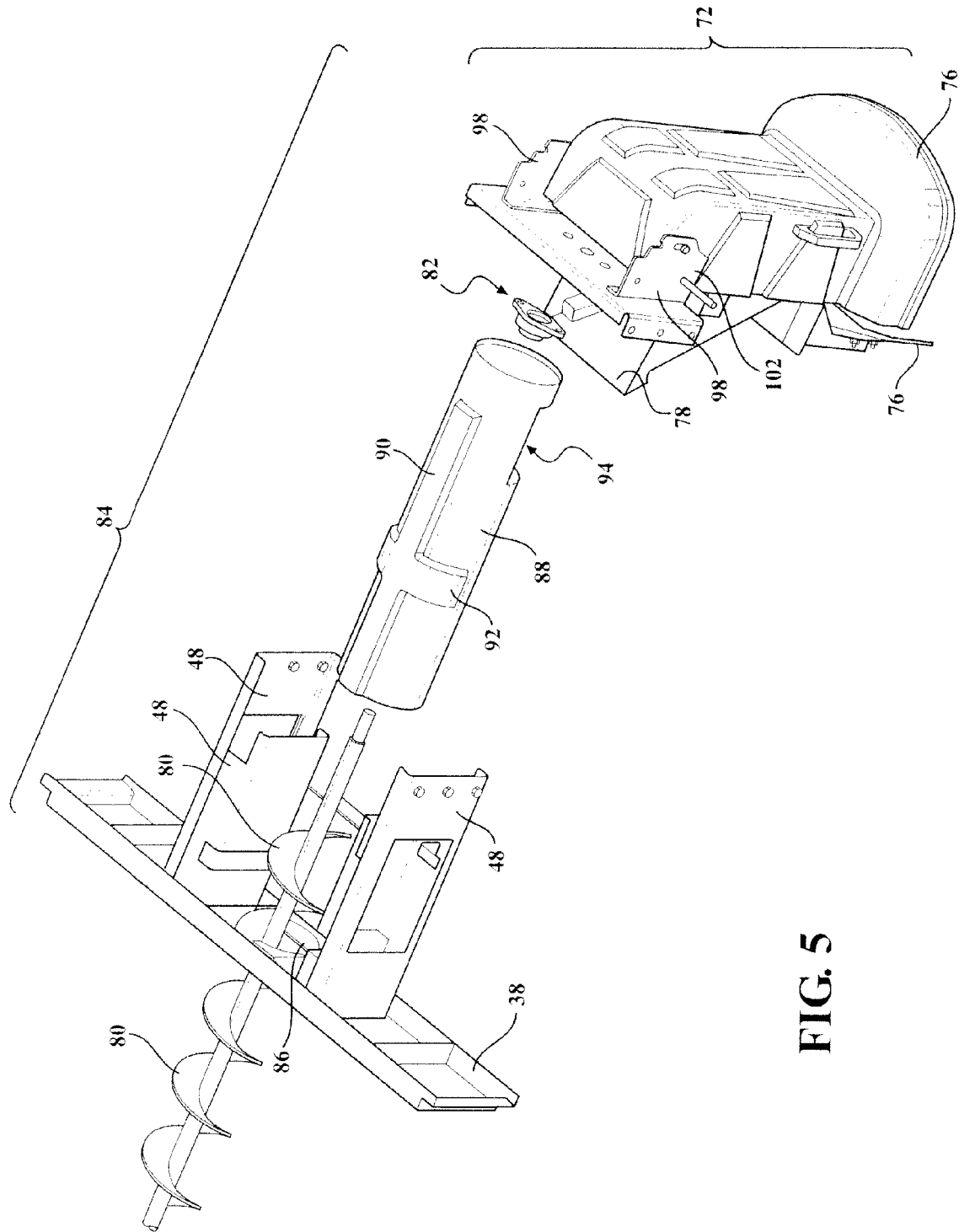
FIG. 5 is a perspective exploded view of the exemplary extension assembly and spinner assembly of the subject invention.
Figure 6:
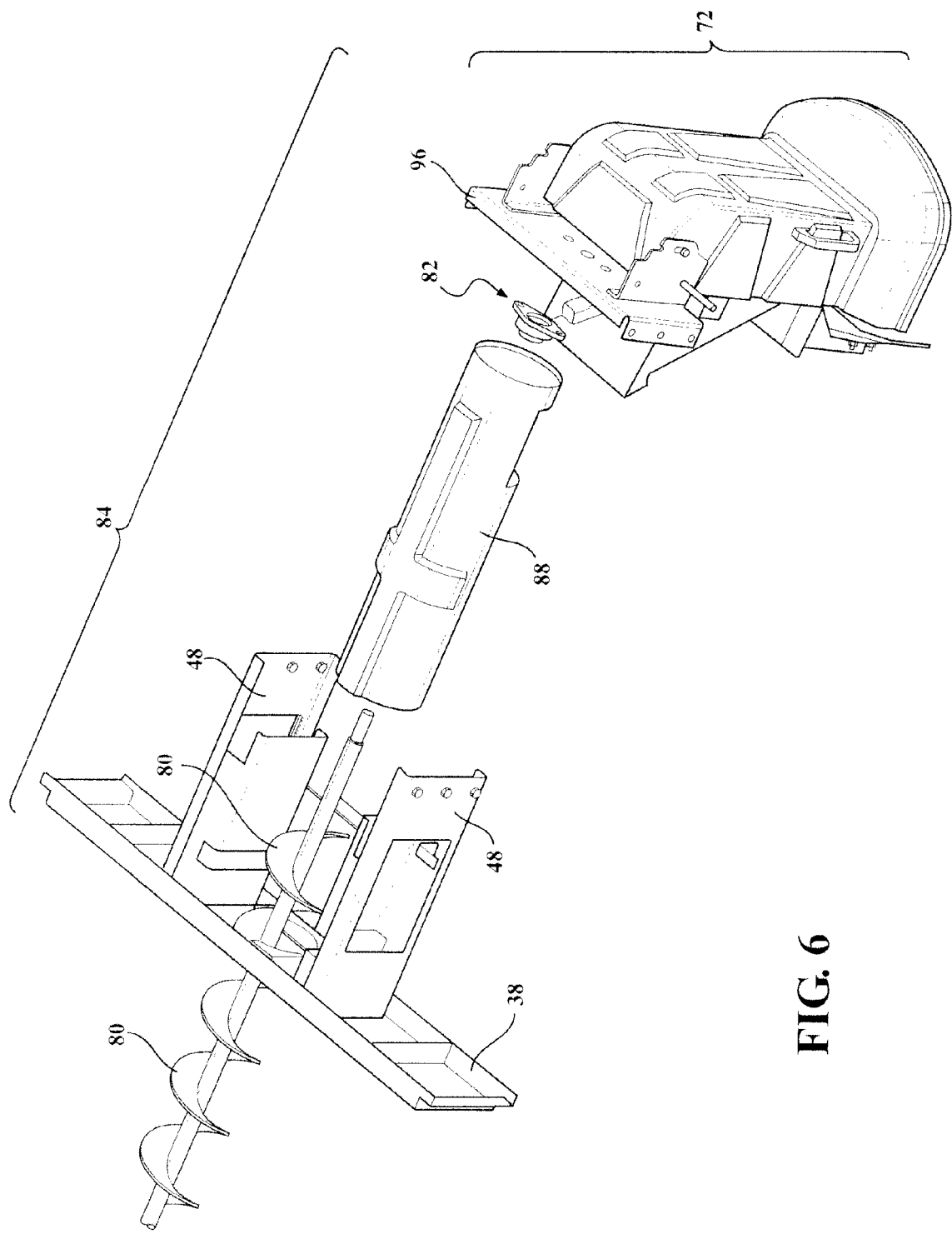
FIG. 6 is a perspective exploded view of the exemplary extension assembly and spinner assembly of the subject invention.

Referring to FIGS. 5 and 6, the spreader assembly 20 further includes material coveyor 80 longitudinally mounted in the lower portion 68 of the hopper 22. In the disclosed embodiment, the material conveyor is an auger, but it should be appreciated by those of ordinary skill in the art that any material conveyor could be used, such as for example a belt conveyor, a mixing bowl, a combination of these, etc. The auger 80 extends toward the outlet 56 for facilitating the discharge of material from the hopper 22 through the outlet 56. The spreader assembly 20 has an auger drive assembly (not shown) that powers the auger 80. Alternatively, it should be appreciated that the auger 80 and the drive shaft of the spinner assembly 72 may be rotatably connected through a coupling or transmission wherein only a single drive motor is required. Such a transmission capable of driving both the auger 80 and the spinner assembly 72 is disclosed in U.S. Pat. No. 8,025,245 to Truan et al., the entirety of which is incorporated herein by reference. It should also be appreciated by those of ordinary skill in the art that the driving motor could include, electric power, hydraulic power, gas power etc. or a combination of these if desired. In the disclosed embodiment, the auger 80 extends through the hopper 22 and out of the outlet 56 wherein a portion of the auger 80 protrudes from the outlet 56 of the hopper 22. As will be appreciated by those of ordinary skill in the art, the auger drive rotates the auger 80 to communicate material from the hopper 22, through the outlet 56, and to the feed chute 78 of the spinner assembly 72. Preferably, the auger 80 extends between a transmission assembly of the auger drive and a bearing 82 adjacent the spinner assembly 72.

The sloped bottom 54 and slanted lower side walls 66 of the hopper 22 direct material toward the auger 80 as the auger 80 pushes material toward the outlet 56. A flow facilitator (not shown) may be mounted in the hopper 22 adjacent the auger 80 to facilitate the flow of material to auger 80. Such a flow facilitator is disclosed in U.S. Pat. No. 6,953,163 to Truan et al. and U.S. Pat. No. 7,540,436 to Truan et al., the entirety of which are incorporated herein by reference. The flow facilitator is preferably a V-shaped plate and formed at about a 45 degree angle. The plate may be differently shaped and still accomplish the subject invention. Further, different angles of the plate may be utilized to accomplish the subject invention, for example, a 30 degree angle or a 60 degree angle may be employed. The V-shape of the plate generally defines a knife edge. A mounting bracket extends from the plate to at least one wall of the hopper 22. A vibrator may be operatively connected to the mounting bracket or to the V-shaped plate to create vibrations with the flow facilitator to improve material flow. In the preferred embodiment, connecting rods and mounting brackets connect the plate to the lower side walls 66 of the hopper 22. The connecting rods allow material to be distributed and flow easily down to the bottom 54 of the hopper 22 without clogging the auger 80 or the outlet 56. A screen may also be used to screen out larger materials thereby preventing clogging or the spreader.

The flow facilitator improves the flow of material in several ways. In the first way, flow facilitator restricts the flow of material from within the hopper 22 to the area immediately adjacent to the auger 80. The flow facilitator functions like a shield to control the amount of material that reaches the auger 80. The material is supported on the top of the flow facilitator and flows around the edges of the flow facilitator through the gap between the walls of the lower portion 68 of the hopper 22. A further way is that the flow facilitator relieves weight upon the auger 80. This allows the auger 80 to begin to rotate without having to rotate under the weight of the material in the hopper 22. A still further advantage is that the flow facilitator allows the material on the auger 80 to "burp" or heave upward when the auger 80 starts to rotate. This relieves some of the weight on the auger 80 allowing it to begin operation with less power and reducing the potential for the auger 80 to lock up. Another way is that the flow facilitator vibrates to agitate the material within the hopper 22 so that it continues to flow around the edges of the flow facilitator to the auger 80. The flow facilitator also functions as a chisel when vibrated to cut through the material.

Figure 8:
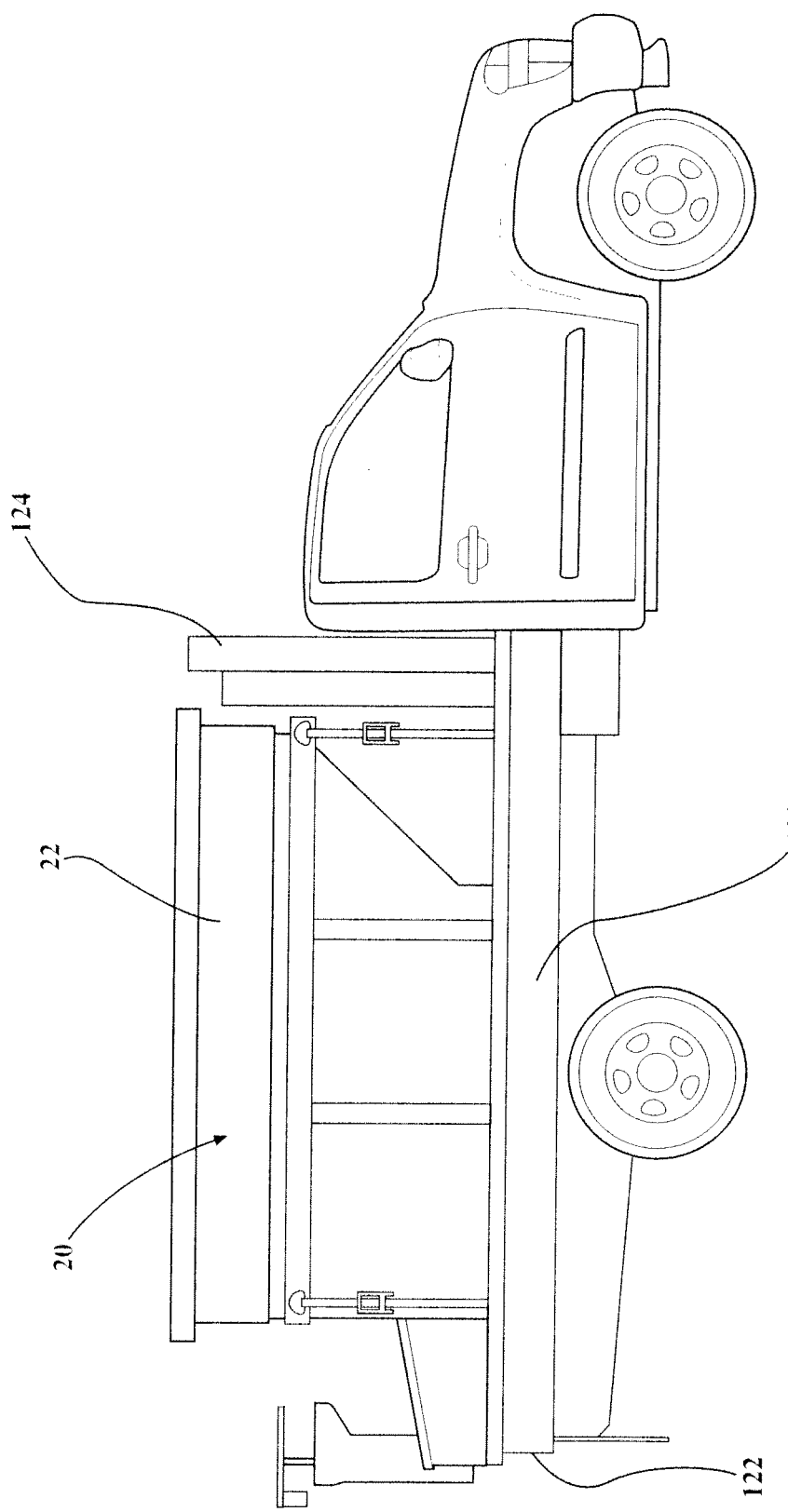
FIG. 8 is a side view of the exemplary truck bed material spreader mounted upon the bed of a vehicle.

Referring again to FIGS. 1 and 2, the spinner assembly 72 of the subject invention is longitudinally spaced from the outlet 56 of the hopper 22. To maintain the communication of the material between the hopper 22 and the longitudinally spaced spinner assembly 72, the spreader assembly 20 includes an auger extension assembly 84 extending between the outlet 56 of the hopper 22 and the spinner assembly 72. The auger extension assembly 84 projects substantially horizontally from the rear base member 38 of the frame 24 such that all components of the extension assembly 84 are even with, or above, the rear base member 38 and therefore the truck bed. This allows for a cab-forward placement of the hopper 22 and frame 24 wherein the front end 50 of the hopper 22 and the front base member 36 of the frame 24 abut the cab of the vehicle and the rear end 52 of the hopper 22 and the rear base member 38 are positioned forward of the rear most portion of the truck bed. For example, the rear end 52 of the hopper 22 may be spaced forward of the rearmost portion of the truck bed to better distribute the weight of the hopper as shown in FIG. 8. As can be seen in FIG. 8, the hopper 22 is placed forward on the truck bed 120 adjacent the front portion 124. The spinner assembly 72 is adjacent the rear portion 122 of the bed 120. The extension assembly 84 extends between the hopper 22 and spinner assembly 72. In some applications, the rear end 52 may be substantially vertically aligned with a rear axle of the vehicle or may be positioned forward of the rear axle. The extension assembly 84 extends longitudinally from the rear base member 38 to a position adjacent the rear most portion of the truck bed where it connects to the spinner assembly 72. In this manner, the extension assembly 84 conveys or communicates the material exiting the outlet 56 of the hopper 22 to the spinner assembly 72, which is longitudinally spaced from the hopper 22 and is adjacent the rear most portion of the truck bed. Accordingly, the cab-forward design of the spreader assembly 20, as provided by the extension assembly 84, moves the significant weight of the filled hopper 22 and the frame 24 forward towards the cab (the front) of the vehicle. As a result, better front-to-rear weight distribution of the vehicle is achieved. The improvement in vehicle weight distribution over the prior art designs contributes to better vehicle handling characteristics and less stress on the vehicle chassis and suspension components.

More particularly, the extension assembly 84 extends rearward from the rear base member 38 of the frame 24. It should be appreciated by those of ordinary skill in the art that the extension assembly 84 could be removably mounted to the rear base member 38, or integrally mounted to the base member 38, or removably mounted to the hopper 22, in the event the base member 38 is not used, or integrally formed to the hopper 22. As best seen in FIGS. 3 and 4, the rear base member 38 includes an opening 86 mating with the outlet 56 of the hopper 22. In the disclosed embodiment, the auger 80 projects from the outlet 56 of the hopper 22, through the opening 86 in the rear base member 38, and extends longitudinally into the extension assembly 84. It should be appreciated by those of ordinary skill in the art that the auger 80 may not extend into the extension assembly 84, in which example the extension assembly 84 would house a separate material conveyor that is fed material from the auger 80, or other suitable material conveyor.

The extension assembly 84 includes a feed tube 88 extending about and housing the portion of the auger 80 extending into the extension assembly 84. Accordingly, the feed tube 88 extends longitudinally through the extension assembly 84. Additionally, the feed tube 88 may mate with and extend through the opening 86 in the rear base member 38 such that a portion of the feed tube 88 extends through the outlet 56 and into the hopper 22. Preferably, the feed tube 88 is generally cylindrical in shape; however, feed tubes 88 of other shapes and cross-sections may be used.

The feed tube 88 houses a portion of the auger 80 and facilitates the communication of material from the hopper 22 to the spinner assembly 72. In use, the auger 80 moves the material along its length and through the feed tube 88. Preferably, the feed tube 88 has a smooth and continuous wall. As best seen in FIGS. 5 and 6, the wall of the feed tube 88 may include one or more alignment protrusions 90, 92 for aligning and securing the feed tube 88 within the opening 86 of the rear base member 38. As shown in FIGS. 3 and 4, the opening 86 of the rear base member 38 may include a slot in a twelve o'clock position. The feed tube 88 may include a first alignment protrusion 90 extending longitudinally along the wall of the feed tube 88 in a twelve o'clock position for engaging the slot as the feed tube 88 is inserted into the opening 86 of the rear base member 38 during assembly. The feed tube 88 may further include second alignment protrusion 92 extending annularly about the wall of the feed tube 88 to abut the rear base member 38 and act as a stop when the feed tube 88 is inserted into the opening 86 during assembly. Accordingly, the first alignment protrusion 90 prevents rotation of the feed tube 88 relative to the opening 86 in the rear base member 38 and the second alignment protrusion 92 prevent the feed tube 88 from moving longitudinally with respect to the rear base member 38.

Referring to FIGS. 5 and 6, the feed tube 88 includes a discharge window 94 positioned adjacent the feed chute 78 of the spinner assembly 72. Thus, the discharge window 94 is located opposite the outlet 56 of the hopper 22 and is in a six o'clock position thereby allowing gravity to carry the material downwardly from the discharge window 94 and into the feed chute 78. The extension box further includes a pair of longitudinal supports 48 and a back plate 96. The pair of longitudinal supports 48 extend longitudinally rearward from the rear base member 38, each being parallel to one another and disposed on either side of the feed tube 88. The longitudinal supports 48 of the extension assembly 84 may be spaced from the feed tube 88, or alternatively, may abut the feed tube 88 to provide additional support. The back plate 96 is attached to the longitudinal supports 48 opposite the rear base member 38. The spinner assembly 72 is connected to and supported by the back plate 96. The back plate 96 may include a pair of mounting brackets 98 for connecting the spinner assembly 72 to the extension assembly 84. Additionally, the bearing 80 supporting the auger 80 is attached to and supported by the back plate 96. Accordingly, the auger 80 and the feed tube 88 extend longitudinally through the opening 86 in the rear base member 38 and to back plate 96 of the extension assembly 84. Such an arrangement places the discharge window 94 of the feed tube 88 adjacent the back plate 96. A shroud 100 may be included to cover one or more components of the extension assembly 84.

The extension assembly 84 and feed tube 88 further provide an additional advantage in that the material communicated to the spinner assembly 72 can be precisely controlled or metered. In conventional truck bed mounted spreaders, the auger 80 is mounted entirely within the hopper 22 and functions to communicate the material contained therein towards outlet 56 of the hopper 22. Accordingly, when the auger 80 is deactivated, material can still flow (leak) through the outlet 56 and into the feed chute 78 of the spinner assembly 72. If the spinner assembly 72 is also deactivated, the material can accumulate in the spinner assembly 72 and fall to the ground in clumps. This commonly occurs where the vehicle is traveling over rough terrain, which can shake material out of the hopper 22 when the auger 80 and spinner assembly 72 are deactivated. The extension assembly 84 and feed tube 88 arrangement of the present invention prevent the unwanted leakage of material from the spreader assembly 20 because the auger 80 extends through the outlet 56 of the hopper 22 and into the feed tube 88 thereby blocking the free flow of material through the outlet 56 when the auger 80 is deactivated. More precise metering of the material communicated to the spinner assembly 72 is also achieved. The only material that reaches the feed chute 78 of the spinner assembly 72 is that portion of material communicated to the discharge window 94 of the feed tube 88 by each turn (rotation) of the auger 80.

Figure 7:
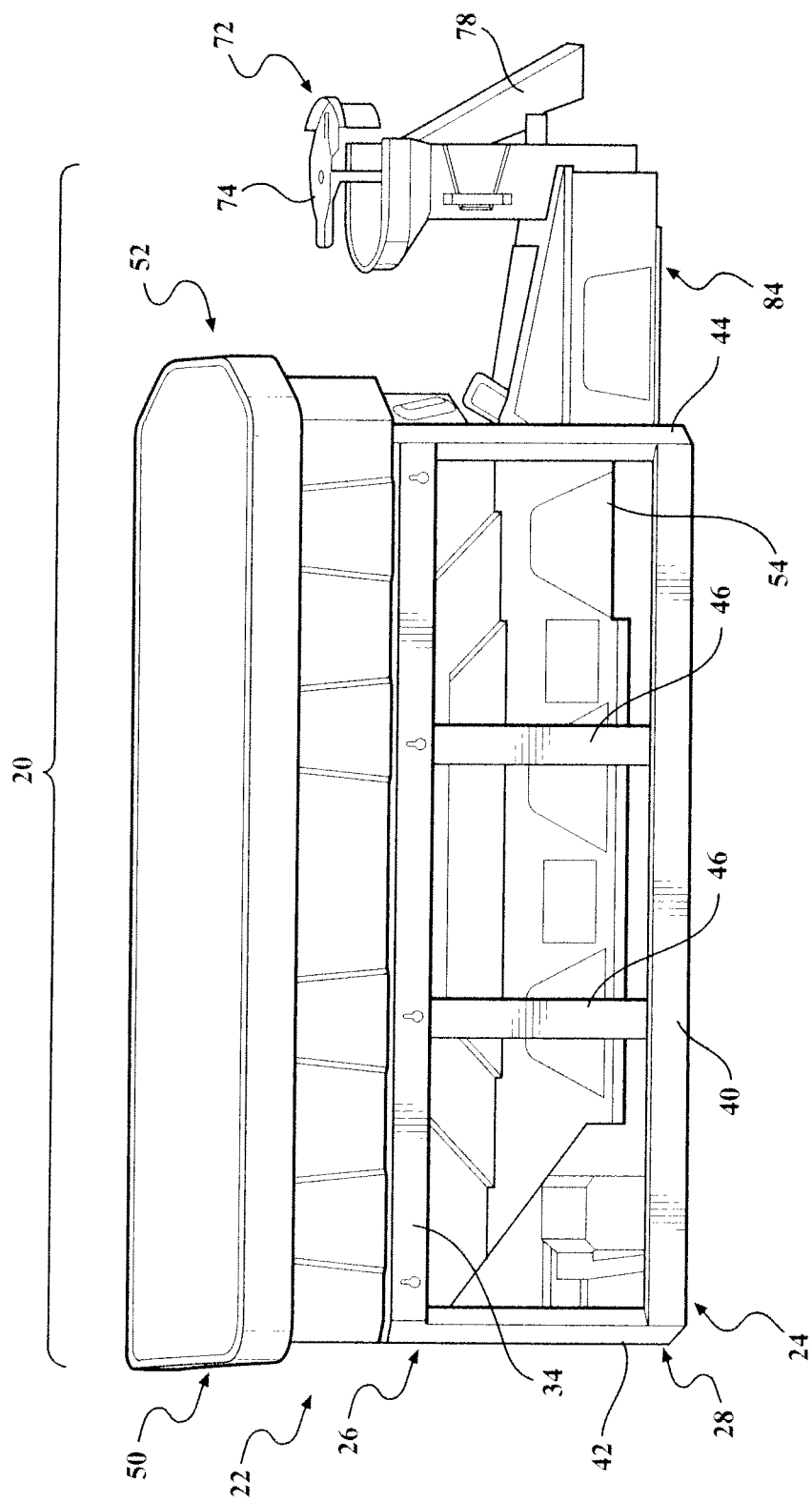
FIG. 7 is a perspective view of the exemplary truck bed mounted material spreader of the subject invention showing the spinner assembly in a storage position.

Referring to FIGS. 3 and 4, the spinner assembly 72 may be rotatably connected to the extension assembly 84 such that the spinner assembly 72 is moveable between an operating position, shown in FIGS. 3 and 4, and a storage position, shown in FIG. 7. In the operating position, the spinner assembly 72 is substantially vertical with the disc 74 disposed generally below the feed chute 78. In the storage position, the spinner assembly 72 is rotated upwards such that the disc 74 is generally above the feed chute 78. A locking mechanism is utilized to engage the mounting brackets 98 of the back plate 96 for locking the spinner assembly 72 in the operating position and in the storage position. The locking mechanism includes a pivot 102 connected to the mounting brackets 98, best seen in FIG. 4. The pivot 102 is preferably a bolt type connection between the mounting brackets 98 and the housing of the spinner assembly 72. The locking mechanism further includes a first locking point 104 for locking the spinner assembly 72 in the operating position and a second locking point 106 for locking the spinner assembly 72 in the storage position. A pin or bolt may then be inserted into the first or second locking point 104, 106 to hold the spinner assembly 72 in the desired position. The housing of the spinner assembly 72 may also include one or more handles for facilitating the rotation of the spinner assembly 72 between the operating position and the storage position. The pivot 102 and locking mechanism of the disclosed embodiment further provides the added advantage of enabling easy removal and repair of the spinner assembly 72, protecting the spinner assembly 72, when not in use as well as making the overall length of the material spreader assembly shorter for parking the vehicle or storing the material spreader assembly. It should be appreciated by those of ordinary skill in the art that the spinner assembly 72 could be designed to pivot further with respect to the extension assembly 84, such that it rests upon the extension assembly 84 when rotated and not in use.

As shown in FIGS. 3 and 4, the subject material spreader assembly may additionally include a liquid sprayer system for pre-wetting the material as it exits the hopper 22 and enters the spinner assembly 72. Pre-wetting is the process of, for example, spraying salt or a salt mixture with water or a brine mixture before spreading the salt on a roadway. Pre-wetting the salt helps it work more effectively as a deicing agent for two reasons. First, wet salt clings to the road instead of bouncing off or being swept off by traffic. The result is that less salt is spread, saving money and minimizing the threat to the environment. Second, to be effective as a deicing agent, salt requires moisture. Moisture dissolves the salt, releasing heat and thereby melting the ice and snow, as well as breaking the ice-road bond. When temperatures drop below freezing there is no moisture on the road, and salt alone is ineffective. Pre-wetting the salt ensures that there will be enough moisture to facilitate the melting process. The liquid sprayer system may include spray nozzles 108 mounted to the feed tube 88 to supply liquid to the material as it passes through the feed tube 88. The spray nozzles 108 are connected by hoses to a liquid pump 110 in fluid communication with a tank containing the liquid (not shown). Upon activation of the spray nozzles 108, the liquid and the material being spread (e.g. salt) is mixed within the feed tube 88 before it is supplied to the spinner assembly 72. This ensures complete mixing between the liquid, the salt, and other additives in the material (e.g. sand) before it is spread by the spinner assembly 72. This provides an additional advantage because the material is pre-wet and premixed as it exits the feed tube 88. It also ensures that the salt is energized by the liquid before spreading. Without adding the liquid to the material, the material tends to bounce around when it hits the distribution area (e.g. a roadway) and does not stay in the desired location. Pre-wetting the material addresses this problem because the pre-wet material tends to stick to the distribution area and does not tend to drift or bounce around.

A controller (not shown) is capable of controlling both the motor of the auger 80 and the motor of the spinner assembly 72. The controller has infinite control and typically operates the two motors. Preferably, the controller is housed within the vehicle. A spinner motor to spinner transmission reduction ratio of 8:1 and an auger motor to auger transmission reduction ratio of 20:1 may be used. Where the liquid spray system is employed, the controller controls the auger 80, spinner assembly 72, and the liquid pump 110 and the feed rate of each. One feature of the controller is the ability to monitor the auger feed rate and automatically adjust the amount of liquid supplied to the feed tube 88. The controller will supply a certain amount of liquid for a given auger speed.

Referring to the Figures, wherein like numerals indicate corresponding parts throughout the several views, Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A material spreader adapted to be mounted to a vehicle, said vehicle having a vehicle bed with a laterally extending front and rear portion, said spreader comprising:
a hopper including a base extending along a plane for overlying said bed of the vehicle and further including a front end wall and a rear end wall extending transversely from said plane of said base in spaced relationship with one another and including a pair of side walls, said hopper for receiving and containing material to be spread, said hopper having a hopper outlet positioned in said rear end wall above said plane for discharging material to be spread, said hopper being adapted to mount upon said vehicle bed with said hopper outlet being spaced from said rear portion of said vehicle bed; said front end wall of said hopper being positioned adjacent said front portion of said vehicle bed, wherein said hopper is positioned forward of said rear portion of said vehicle bed and adjacent said front portion of said vehicle bed;
a spinner assembly spaced from said hopper outlet and said rear end wall by a conveying distance and adjacent said rear portion of said vehicle bed for maintaining all of the material within said hopper forward of said rear portion of said vehicle bed by said conveying distance;
a material conveyor disposed parallel to and above said plane of said base and extending at least said conveying distance from inside said hopper through said hopper outlet to said spinner assembly, said material conveyor adapted to convey material from said hopper to said spinner assembly;
an extension assembly disposed parallel to and above said plane of said base and extending at least said conveying distance between said hopper outlet in said rear end wall over and above said plane of said base to said spinner assembly, said material conveyor being housed within said extension assembly such that said extension assembly surrounds and guides the material moved said conveying distance by said material conveyor from said hopper outlet over and above said plane of said base to said spinner assembly;
whereby, said hopper is adapted to be positioned upon the vehicle above said vehicle bed such that said front end wall is positioned forward adjacent said front portion of said vehicle bed, said rear end wall is positioned forward of said rear portion of said vehicle bed by said conveying distance, such that the material within said hopper is substantially positioned forward of said rear portion of said vehicle bed, said material conveyor being adapted to convey material to said spinner assembly and said spinner assembly to distribute said material received from said material conveyor.

2. The material spreader of claim 1, wherein said material conveyor is an auger, said auger including a plurality of blades extending radially and outwardly from said auger in a helical configuration allowing the auger to move material from said hopper to said spinner.

3. The material spreader of claim 2, wherein said auger extends from adjacent said front wall of said hopper through said hopper outlet to said spinner assembly.

4. The material spreader of claim 2, further including an elongated tube encircling said auger closely adjacent said blades; said elongated tube being mounted within said extension assembly and extending from said hopper outlet to said spinner assembly, said elongated tube having an opening for discharging material to said spinner assembly, said blades being adapted to close said opening when said auger stops.

5. The material spreader of claim 1, further including at least one liquid inlet for injecting liquid into said extension assembly and upon said conveyor.

6. The material spreader of claim 5, further including a pump for pumping fluid to said fluid inlet.

7. The material spreader of claim 1, further including a controller for controlling the operation of said auger and said spinner assembly.

8. The material spreader of claim 6, further including a controller for controlling the operation of said auger, said spinner assembly and said pump such that the injection of liquid is relative to the speed of the auger.

9. The material spreader of claim 1, wherein said spinner assembly is rotatably connected to said extension assembly, such that said spinner assembly is rotatable relative to said extension assembly and said material conveyor.

10. The material spreader of claim 9, wherein said spinner assembly is rotated with respect to said extension assembly to a storage position wherein said spinner assembly is substantially positioned forward of said rear portion of said vehicle bed.

11. A material spreader adapted to be mounted to a vehicle having a vehicle bed extending between a rear portion and a front portion, said spreader comprising:
a hopper for receiving and containing material to be spread having a base extending along a plane for overlying the vehicle bed, front and rear end walls extending transversely to said base in spaced relationship with one another, and side walls, said hopper having a hopper outlet positioned in said rear end wall above said plane for discharging material to be spread,
a spinner assembly spaced longitudinally apart from said hopper rear end wall and said outlet by a conveying distance for maintaining all of the material within said hopper positioned said conveying distance forward of said spinner assembly and the rear portion of the vehicle bed;
an extension assembly disposed parallel to and above said plane of said base and extending at least said conveying distance from said hopper outlet in said rear end wall over and above said plane of said base to said spinner assembly, said extension assembly containing a material conveyor operably connecting said hopper outlet and said spinner assembly, said material conveyor disposed parallel to and above said plane of said base and extending at least said conveying distance from inside said hopper through said hopper outlet to said spinner assembly and being adapted to convey material from said hopper by said conveying distance to said longitudinally spaced apart spinner assembly.

12. The material spreader of claim 11, further including at least one fluid inlet for injecting fluid into said extension assembly and upon said material conveyor.

13. The material spreader of claim 11, wherein said material conveyor is an auger, said auger includes a plurality of blades extending radially and outwardly from said auger in a helical configuration for allowing the auger to move material from said hopper to said spinner assembly.

14. The material spreader of claim 13, further including an elongated tube encircling said auger closely adjacent said blades; said elongated tube being mounted within said extension assembly and extending from said hopper outlet to said spinner assembly, said elongated tube having an opening for discharging material to said spinner assembly, said blades being adapted to close said opening when said auger stops.

15. The material spreader of claim 11, wherein said auger extends from adjacent said front wall of said hopper through said hopper outlet to said spinner assembly.

16. The material spreader of claim 12, further including a pump for pumping liquid to said liquid inlet.

17. The material spreader of claim 11, further including a controller for controlling the operation of said material conveyor and said spinner assembly.

18. The material spreader of claim 16, further including a controller for controlling the operation of said material conveyor, said spinner assembly and said pump such that the injection of liquid is controlled relative to the speed of the auger.

19. The material spreader of claim 11, wherein said spinner assembly is rotatably connected to said extension assembly, such that said spinner assembly is rotatable relative to said extension assembly and said material conveyor.

20. A material spreader extension assembly for extending the distance between a hopper outlet defined by an end wall of a hopper of a material spreader and a spinner assembly, the hopper further including a base extending along a plane for overlying a vehicle bed having a front portion and a rear portion, said material spreader extension comprising:
a material conveyor support housing, said support housing adapted to be disposed parallel to and above said plane of said base of said hopper and to extend a conveying distance between said hopper outlet and said spinner assembly for maintaining all of the material within said hopper positioned said conveying distance forward of said spinner assembly and said rear portion of the vehicle bed, said material conveyor support housing having a first opening in operable communication with said hopper outlet and a second opening in operable communication with said spinner assembly;
a material conveyor extending from at least said first opening to said second opening adjacent said spinner assembly for maintaining all of the material within said hopper forward of said spinner assembly, said material conveyor adapted to be disposed parallel to and above said plane of said base of said hopper in said material conveyor support housing, and said material conveyor being adapted to convey material from said first opening to said second opening for deposit upon said spinner assembly;
at least one fluid inlet for injecting fluid into said material conveyor support housing and upon said material being conveyed;
whereby said material can be pre-wet prior to discharge from said second opening and deposit upon said spinner.

21. The material spreader extension of claim 20, further including a spinner assembly mounted to said housing, whereby said material spreader extension and said spinner assembly are an integral unit.

22. The material spreader extension of claim 20, further including a hopper for containing a material to be spread, said hopper being operatively connected to said support housing.

23. The material spreader extension of claim 22, wherein said material conveyor extends through said hopper.

24. The material spreader extension of claim 20, wherein said material conveyor is an auger, said auger including a plurality of blades extending radially and outwardly from said auger in a helical configuration allowing the auger to move material from said hopper to said spinner.

25. The material spreader extension of claim 24, further including an elongated tube encircling said auger closely adjacent said blades; said elongated tube being mounted within said support housing and extending from said hopper outlet to said spinner, said elongated tube having an opening for discharging material to said spinner, said blades being adapted to close said opening when said auger stops.

26. The material spreader of claim 20, further including a controller for controlling the operation of said auger and said spinner assembly.

27. The material spreader of claim 20, further including a pump for pumping liquid to said liquid inlet.

28. The material spreader of claim 27, further including a controller for controlling the operation of said auger, said spinner assembly and said pump such that the injection of liquid is relative to the speed of the auger.

29. The material spreader of claim 20, wherein said spinner assembly is rotatably connected to said extension assembly, such that said spinner assembly is rotatable relative to said extension assembly and said material conveyor.

* * * * *